(12) United States Patent
Winner

(10) Patent No.: US 6,272,074 B1
(45) Date of Patent: *Aug. 7, 2001

(54) METHOD AND APPARATUS FOR GENERATING RECURRING EVENTS IN A CALENDAR/SCHEDULE SYSTEM

(75) Inventor: Eric J. Winner, San Carlos, CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,842

(22) Filed: Jul. 1, 1997

Related U.S. Application Data

(63) Continuation of application No. 08/483,826, filed on Jun. 7, 1995, now abandoned, which is a continuation of application No. 08/126,032, filed on Sep. 23, 1993, now abandoned.

(51) Int. Cl.[7] ........................... G04B 47/00; G04B 19/24; G06F 7/60
(52) U.S. Cl. .............................. 368/10; 368/28; 705/8; 705/9
(58) Field of Search ............................... 368/10, 28–30, 368/41–43, 82–84; 364/569, 705.08; 705/8, 9

(56) References Cited

U.S. PATENT DOCUMENTS

| | | | |
|---|---|---|---|
| 4,415,271 | * 11/1983 | Mori ........................... | 368/41 |
| 4,548,510 | 10/1985 | Levine ........................ | 368/10 |
| 4,626,836 | 12/1986 | Curtis et al. ................ | 340/706 |
| 4,807,155 | 2/1989 | Cree et al. . | |
| 4,819,191 | * 4/1989 | Scully et al. ................ | 364/518 |
| 4,831,552 | 5/1989 | Scully et al. . | |
| 4,852,030 | * 7/1989 | Munday ...................... | 364/569 |
| 4,977,520 | 12/1990 | McGaughey, III et al. ... | 364/521 |
| 5,050,077 | 9/1991 | Vincent ....................... | 364/401 |
| 5,063,543 | * 11/1991 | Shibuya et al. ............. | 368/29 |
| 5,070,470 | 12/1991 | Scully et al. ................ | 364/705.98 |
| 5,093,813 | 3/1992 | Levine ........................ | 368/10 |
| 5,093,901 | 3/1992 | Cree et al. .................. | 395/100 |
| 5,129,057 | 7/1992 | Strope et al. ............... | 395/161 |
| 5,197,000 | 3/1993 | Vincent ....................... | 364/401 |
| 5,199,009 | 3/1993 | Svast .......................... | 368/240 |
| 5,220,540 | 6/1993 | Nishida et al. ............. | 368/41 |
| 5,317,546 | * 5/1994 | Balch et al. ................. | 368/9 |
| 5,893,073 | 4/1999 | Kasso et al. . | |

* cited by examiner

*Primary Examiner*—Vit Miska
(74) *Attorney, Agent, or Firm*—Hickman, Palermo Truong & Becker LLP; Brian D. Hickman; Craig G. Holmes

(57) ABSTRACT

An electronic calendaring and scheduling capability that minimizes storage requirements. Repetitive calendar events are stored as single entries using an expression language. The expression language provides an ability for expressing how often the event recurs. Thus, the days on which the event occurs are computed from an expression stored in a repetitive event. Further, the expression language provides the ability to identify exceptions and to define an infinite number of recurring events from the original recurrent event definition. Events are generated by obtaining a recurrency expression of a first event. The recurrency expression is converted to one or more recurring dates. A beginning date of the first event is also obtained. Using one or more recurring dates and the beginning date, one or more second events are generated in response. The present invention provides the first event and the one or more second events to the users in one or more calendars. The present invention further utilizes a recurrency expression including one or more anti-event expressions. Anti-events have the same format as the recurring event. The anti-event expressions are used to generate one or more exception dates. The exception dates cancel at least one of the recurring dates.

20 Claims, 6 Drawing Sheets

EVENT 410

| | FIELD | STORAGE | DESCRIPTION |
|---|---|---|---|
| 410A | EVENT ID | NUMBER | IDENTIFIES EVENT; |
| 410B | PUBLIC VERSION | NUMBER | VERSION OF A TRANSMITTED EVENT; |
| 410C | PRIVATE VERSION | NUMBER | LOCAL VERSION OF A TRANSMITTED EVENT; |
| 410D | CALENDAR IDENTIFIER | NUMBER | LOCAL CALENDAR IDENTIFIER; |
| 410E | EVENT TYPE | NUMBER | IDENTIFIES TYPE OF EVENT (I.E., REMINDER, MEETING, ETC.); |
| 410F | SCHEDULE DATE | DATE | DATE THAT THE EVENT WAS PUT ON A CALENDAR; |
| 410G | CREATE DATE | DATE | DATE THAT THE EVENT WAS CREATED; |
| 410H | MODIFICATION DATE | DATE | LAST DATE THAT THE EVENT WAS MODIFIED; |
| 410I | RANGE DATE | DATE | DATE FOR A MULTI-DAY OR RECURRING EVENT TO START ON; |
| 410J | BEGIN DATE | DATE | DATE THIS EVENT OCCURS; |
| 410K | BEGIN TIME | NUMBER | MINUTES PAST MIDNIGHT FOR EVENT TO START; |
| 410L | END DATE | DATE | DATE THAT THIS EVENT ENDS; |
| 410M | END TIME | NUMBER | MINUTES PAST MIDNIGHT FOR EVENT TO END; |
| 410N | DURATION | NUMBER | DURATION OF EVENT IN DAYS; |
| 410P | RECURRING | 255 CHARACTERS | FREQUENCY EXPRESSION FOR EVENT; A NULL ENTRY INDICATES THAT THE EVENT IS NON-RECURRING. |
| 410Q | OTHER FIELDS OF EVENT | | |

*Fig. 2*

METHOD AND APPARATUS FOR GENERATING RECURRING EVENTS IN A CALENDAR/SCHEDULE SYSTEM

This is a continuation of application Ser. No. 08/483,826, filed Jun. 7, 1995, now abandoned, which is a continuation of application Ser. No. 08/126,032, filed Sep. 23, 1993 now abandoned.

BACKGROUND OF THE INVENTION

1. Field of the Invention

The present invention is related to the field of systems for generating electronic calendars or schedules of events.

2. Background Art

A scheduling or calendaring system is a system for allowing a user to maintain a calendar of events containing information about the event. The event is recorded at entry points in the calendar relating to the date and time of the event. Interactive calendaring/scheduling systems are typically implemented as electronic calendars using data processing systems. The data processing system may comprise a single data processing unit or a plurality of data processing units coupled together. In a multi-user system comprising a plurality of data processing units, users may schedule events on their personal calendars as well as those of other users.

Prior art systems replicate calendars such that each calendar in the enterprise is stored on every server in the enterprise. Thus, each server must store calendar information for the whole system. Further, when any change is made to a calendar, the change must be replicated at each server. Prior art systems also limit a user to defining a finite number of recurrent events. Further, prior art systems store an entry for each of the repeated events, thereby consuming large amounts of storage space.

A prior art system, disclosed in U.S. Pat. No. 4,548,510 issued to Alfred Levine on Oct. 22, 1985, implements an electronic time scheduler for entering and storing daily schedules of events and appointments. The system provides the ability to obtain (i.e., visually or audibly) a daily schedule of appointments, and a subschedule that identifies times-of-day that are still open. The scheduler can be connected to a center data processor. This prior art system does not provide the ability to store repetitive events as one event with an expression for calculating the repetitive occurrences.

Another prior art system, disclosed in U.S. Pat. No. 4,626,836 issued to Donald E. Curtis, et al. on Dec. 2, 1986, is a method of scheduling a meeting between calendar users. An input screen is displayed that contains input fields for entering desired times, dates, and attendees. A comparison is made between this information and the prospective attendees' calendar information. The comparison is between calendar information that is stored in a host system to which the users are connected. Based on the comparison, an option list is displayed to the invitor, and the invitor can select a meeting time. A meeting notice is sent to the attendees. The prior art system of Curtis, et al. does not provide the ability to store repetitive events as one event with an expression for calculating the repetitive occurrences.

A further prior art system, disclosed in U.S. Pat. No. 4,977,520 issued to Harry S. McGaughey III, et al. on Dec. 11, 1990, implements a method of electronic calendaring in a data processing system with a plurality of interactive terminals that facilitates a user's reply to a meeting invitation. An initial notice advises an invitee that a meeting invitation is available for review. A screen can be displayed that contains the details of the meeting along with entries in the invitee's calendar. Based on this information, an invitee can accept or reject the invitation. The prior art system of McGaughey, et al. does not provide the ability to store repetitive events as one event with an expression for calculating the repetitive occurrences.

A further prior art system, disclosed in U.S. Pat. No. 5,070,470 issued to Keith J. Sculley, et al. on Dec. 3, 1991, provides a capability to automatically generate a data stream to request the status of, or automatically schedule a meeting on, a plurality of calendars maintained by an electronic calendaring system. Information associated with a calendaring event is stored in a data structure with fields that are compared with like fields in the plurality of calendars. These calendars may be stored on the user's system, or on a system that is connected to the user's system. Status information for each of the plurality of calendars is stored in multiple data structures. These data structures are transmitted to the user initiating the event. The prior art system of Sculley does not provide the ability to store repetitive events as one event with an expression for calculating the repetitive occurrences.

Still another prior art system, disclosed in U.S. Pat. No. 5,093,813 issued to Alfred B. Levine on Mar. 3, 1992, is an appointment scheduler that has the ability to automatically locate available times based on user preferences and prior commitments. The scheduler may be used locally or remotely via a telephone line. The invention is capable of comparing multiple calendars resident in a single memory store to coordinate a mutually acceptable meeting time. This system of Levine does not provide the ability to store repetitive events as one event with an expression for calculating the repetitive occurrences.

Yet another prior art system, disclosed in U.S. Pat. No. 5,093,901 issued to Charles M. N. Cree, et al. on Mar. 3, 1992, is a method for exchanging entries in multiple calendars resident on an information processing system. One user can schedule an event and invite other users of the same information processing system by sending each of them a notice or request. The current status of each is determined, an entry for the scheduled meeting is automatically entered in their calendars. The prior art system of Cree, et al. does not provide the ability to store repetitive events as one event with an expression for calculating the repetitive occurrences.

A further prior art system, disclosed in U.S. Pat. No. 5,129,057 issued to Gerald C. Strope, et al. on Jul. 7, 1992, is a method of displaying day calendar information in a viewport of a display, and to schedule an event with other users that are interconnected via a local area network. The invention provides for the ability to connect to a host system via a modem hook-up or a network link. The network link provides the ability for network users to communicate. The host system is used to store information for access by all of the network users. The prior art system of Strope, et al. does not provide the ability to store repetitive events as one event with an expression for calculating the repetitive occurrences.

Another prior art system, disclosed in U.S. Pat. Nos. 5,050,077 and 5,197,000 issued to James P. Vincent on Sep. 17, 1991 and Mar. 23, 1993, respectively, provides a method of scheduling events among terminal users of calendaring applications connected to a host system with processing, storage and retrieval capabilities. An event can be scheduled using a prompting screen with fields for entering desired times, dates, and prospective attendees. If the desired times are not available for all of the prospective, the scheduling criteria can be relaxed and the event can be scheduled automatically. The prior art system of Vincent does not provide the ability to store repetitive events as one event with an expression for calculating the repetitive occurrences.

Still another prior art system, disclosed in U.S. Pat. No. 5,199,009 issued to Geno Svast on Mar. 30, 1993, is a programmable reminder clock for storing times, dates and reminder messages for upcoming events. The prior art system of Svast does not provide the ability to store repetitive events as one event with an expression for calculating the repetitive occurrences.

A further prior art system, disclosed in U.S. Pat. No. 5,220,540 issued to Hiroshi Nishida, et al. on Jun. 15, 1993, implements an apparatus that provides a schedule control function such that a schedule of events are stored in memory at every date and displaying a particular schedule. This invention calculates a present date and time based on a date and time initially set. The prior art system of Nishida does not provide the ability to store repetitive events as one event with an expression for calculating the repetitive occurrences.

SUMMARY OF THE PRESENT INVENTION

The present invention provides an electronic calendaring and scheduling capability that minimizes the storage requirements for the system. Repetitive calendar events (i.e., events that recur at some interval of time) are stored as single entries in the present invention using an expression language. The expression language of the present invention provides an ability for expressing how often the event recurs. Thus, the days on which the event occurs are computed from the expression stored in the repetitive event. Further, the expression language provides the ability to identify exceptions. For example, it is possible to identify a repetitive event as occurring every other day except Mondays and Tuesdays. Thus, if, based on the computations, the recurrent event occurs on a Monday or Tuesday, the event is masked out for those days.

The present invention allows a user to define the recurrence based on an expression, and stores a single event. This provides the ability to define an infinite number of recurrent events from the original recurrent event definition, and minimizes the storage needed for a recurrent event. The present invention begins generating events by obtaining a recurrency expression of a first event. It converts the recurrency expression to one or more recurring dates. It also obtains a beginning date of the first event. Using the one or more recurring dates and the beginning date, it generates one or more second events. The present invention provides the first event and the one or more second events to the users in one or more calendar. The present invention further utilizes a recurrency expression including one or more anti-event expressions. Anti-events have the same format as the recurring event. The anti-event expressions are used to generate one or more exception dates. The exception dates cancel at least one of the recurring dates.

BRIEF DESCRIPTION OF THE DRAWINGS

FIGS. 1A–1E are flow diagrams illustrating the present invention; and,

FIG. 2 is a diagram illustrating an event 410 including a recurring event expression 410P.

DETAILED DESCRIPTION OF THE PRESENT INVENTION

Figure 1A:
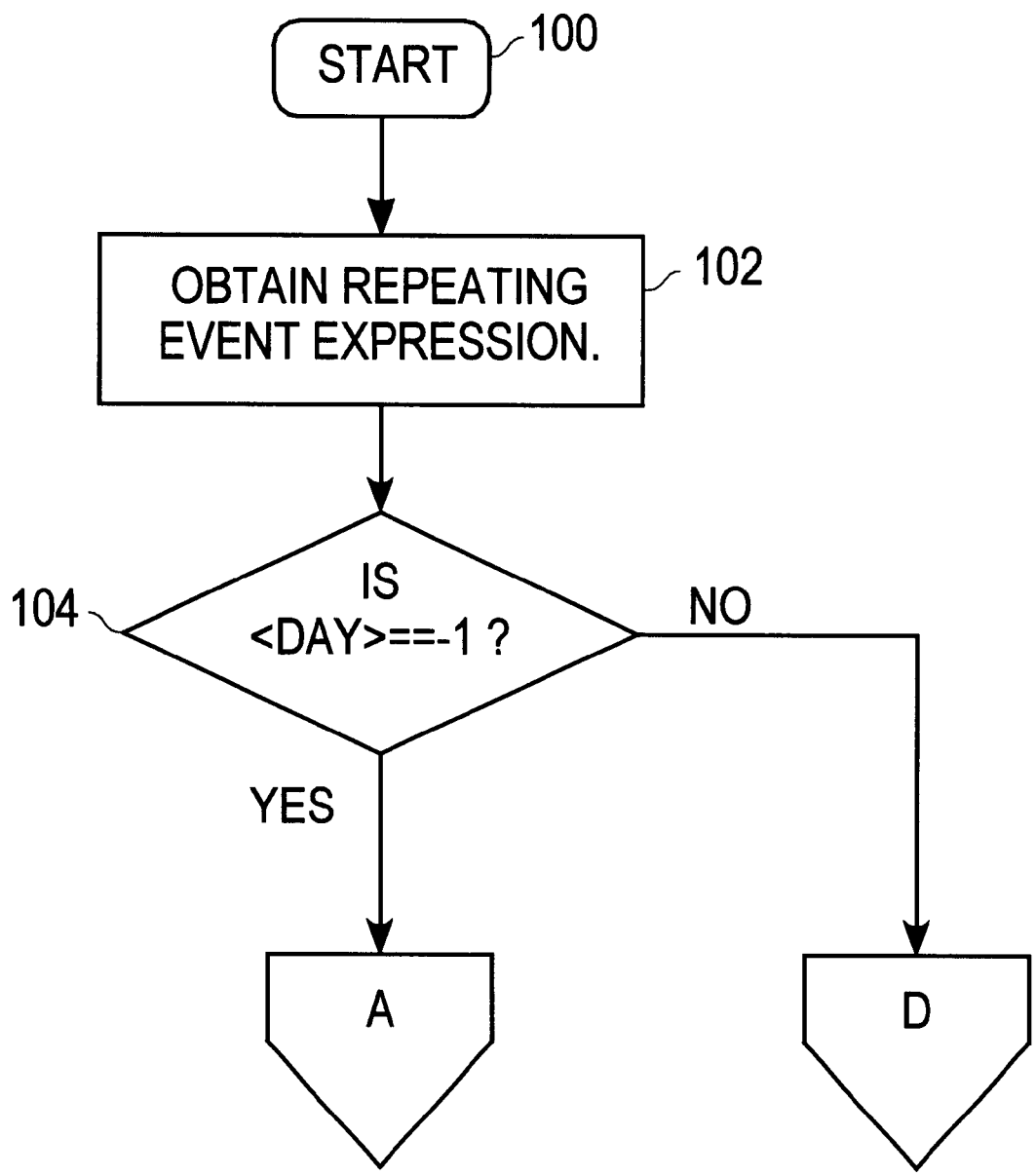

A method for generating recurring events in an electronic calendaring and scheduling system is described. In the following description, numerous specific details, such as event fields, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

Overview of Scheduling System

A scheduler is an electronic system that allows users to maintain personal calendars of events. It also performs enterprise-wide, multi-platform scheduling. The scheduler allows users to schedule calendars with other users having different, possibly incompatible data processing systems. Thus, calendars can be scheduled across platforms regardless of where the calendars reside. The calendar information is stored in Oracle RDBMS for this purpose, and SQL*Net accomplishes network transportation. Scheduling is performed in three manners. In one manner, an event is scheduled by choosing the attendees, date and time of the event, transmitting the event notice using communications means, and placing the event on the appropriate calendars.

In another manner, an event is scheduled by selecting the attendees and then viewing the free time on the calendars of the attendees over a range of times and dates. This is done by performing a view free time query. The data obtained from the attendee's calendars is compiled and displayed. Thus, the user can choose a time when all the users are available. This is done in real-time using remote databases across the above-stated network. A time and date is chosen, and the event is scheduled on the calendars of the attendees.

In still another manner, events are scheduled automatically. The user specifies the attendees, dates and times of the event, duration of the event, as well as other preferences. An event request is submitted to the database so that the scheduler process can complete the request. The scheduler process retrieves the request and sends the message via the network transportation to remote scheduling servers. It requests particular calendar data from the servers. The scheduler process obtains the data, compares the calendar data, and sets an event in the calendars of the attendees when an appropriate event period is determined.

Events

An event is stored as a collection of information in a storage means. In the preferred embodiment of the present invention, an event is a record or table of fields. FIG. 2 is a diagram illustrating an event according to the present invention. The drawing includes Field, Storage and Description headings. The Field column contains the elements 410A–410Q of the event 410 and the Storage column describes how the elements 410A–410Q are stored. The Description column provides a brief statement about the use of the element.

The event id field 410A is a number that identifies the event. The public version field 410B is a number that indicates the version of the transmitted event (sent from another user). Similarly, the private version field 410C is a number that indicates the local version of the transmitted event. The calendar identifier field 410D is a number for identifying the local calendar containing the event 410. The event type field 410E is a number that represents the type of event (i.e., reminder, meeting, etc.). The schedule date field 410F is the date that the event was put on the calendar. The create date field 410G is the date that the event was created. The modification date field 410H is the date that the event was modified. The range date field 410I is a date for a recurring event to start on. This field 410I is used in conjunction with a recurring event expression (described below) by the scheduler to generate recurring events. The begin date field 410J is a date that this event occurs. This field 410J is used for an event that occurs only once. Similarly, the begin time field 410K is a number providing the minutes past midnight when an event begins. The end date and end time fields 410L and 410M are correspondingly the date and time when the event ends. The duration field 410N is a number indicating the duration of the event in days. The recurring event expression 410P is a string of 255 characters (each character is equal to one byte) that provides a frequency expression for a repeating event. A null or empty entry for field 410P indicates that the event is non-recurring. The event 410 may also comprise further fields for the event 410 that are collectively represented by field 410Q.

The event 410 illustrated in FIG. 2 provides a description of the information stored in a calendar. The event 410 describes the type of event that it is, when it was created, and when it occurs. The event can be specified to begin at a specific date and time, last for a given amount of time, and when to end. Further, the present invention allows a repeating event to be stored as a single event using the recurring event expression 410P. This advantageously reduces the amount of storage space required for storing a recurring event.

Recurring Events

The present invention allows for a variety of forms of repeating events. Each repeating event is stored as a single entry in the database of calendar events. The single entry includes an expression 410P for determining how often the event occurs. The expression 410P for describing a recurring, or repeating, event includes several fields that are described below and are illustrated in Table 1. The expression 410P is stored as a text string of known size. The data stored in the recurring event expression 410P enables the scheduler process to compute the days on which an event occurs. Further, the present invention is able to derive a language, or textual, representation of the data (i.e., "daily", "monthly", etc.) from the expression.

Referring to Table 1, an illustration of the recurring event expression is provided. The table illustrates the format, order, and number of fields contained in the recurring event expression 410P of the present invention. The recurring event expression is labelled more simply as a recurrence expression. The recurrence expression 410P contains nine fields, including: <weekday>, <day>, <month>, <year>, <weeknum>, <xdays>, <xmonths>, <working>, and <terminator>.

TABLE 1

Recurrence Expression:
<weekday> <day> <month> <year> <weeknum> <xdays>
<xmonths> <working> <terminator> where

| Fields | Values |
|---|---|
| <weekday> | 1 to 7 (1==Sunday, 7==Saturday), −1 == wild card; |
| <day> | 1 to 31 (day of month), 99 == last day of month, −1 == wild card; |
| <month> | 1 to 12 (1==January, 12==December), −1 == wild card; |
| <year> | −4712 to +4712, −5000 == wild card; |
| <weeknum> | 1 to 5 (5 == last week of month), |

TABLE 1-continued

Recurrence Expression:
<weekday> <day> <month> <year> <weeknum> <xdays>
<xmonths> <working> <terminator> where

| Fields | Values |
|---|---|
|  | −1 == wild card; |
| <xdays> | 1 to ???, −1 == wildcard; |
| <xmonths> | 1 to ???, −1 == wild card; |
| <working> | 0 == skip if event occurs on a non-work day, 1 == move event to next work day, −1 == move event to previous work day, −99 == wild card (working days do not apply); |
| <terminator> | "#" expression terminator. |

The weekday field contains a numeric text value representing the day of the week. Values of 1 through 7 in this field are equal to the days of Sunday through Saturday, respectively. A value of −1 in this field is a wild card indicating that any or every value of the particular field applies. For instance, a value of −1 in the weekday field means any day Sunday through Saturday applies. The day field contains numeric values for representing the day of the month. Values of 1 through 31 in this field are allowed up to the maximum of 31 for the days of the longest months in a calendar year. A value of 99 in the day field represents the last day of the month. This allows the user to schedule an event for the last day of one or more months without entering a specific value for each month. For instance, a value of 99 corresponds to a day value of 30 for April or 31 for January. Similarly, the value of 99 selects the last day of February taking into account the effect of leap years on the calendar. For the day field, a value of −1 is again a wild card.

The month field of the recurrence expression contains a numeric value representing the months. It has values of 1 through 12 corresponding to the months January through December. A value of −1 is a wild card for the month field. The year field contains a numeric value corresponding to a calendar year. It has values of −4712 through +4712 corresponding to the years 4712 BC to 4712 AD. The numeric value −5000 is a wild card for the year field. The weeknum field contains a numeric value representing the week of the month. It has value of 1 through 5, with 5 being the last, possible week of any month. The numeric value of −1 is a wild card for the weeknum field.

The xdays field of the recurrence expression, illustrated in Table 1, represents a frequency of every x days. It has values beginning at 1. Its upper limit is not limited to any particular value. For instance, a value of 2 indicates a frequency of every two days while a value of 60 indicates a frequency of every sixty days. A value of −1 is a wild card for the every x days field. The xmonths field represents a frequency of every x months. It has values beginning at 1. Its upper limit is not limited to any particular value. For instance, a value of 1 indicates a frequency of every month while a value of 18 indicates a frequency of every eighteen months. A value of −1 is a wild card for the every x months field.

Referring to Table 1, the working field relates to the working days of an individual. For instance, many employees in an enterprise may have a traditional work schedule of Monday through Friday, while others work Tuesday through Friday, and yet others have schedules of Saturday through Wednesday. A numeric value of 0 indicates to skip an event if the event occurs on a non-work day. It indicates that the event should not occur on non-working days, and when an occurrence falls on a non-working day, the occurrence is skipped. A value of 1 indicates to move the event to the next work day. Conversely, a value of −1 indicates to move the event to the previous work day. A value of −99 is a wild card indicating that working days do not apply. The terminator field simply contains a character "#" to indicate termination of a recurring event expression. When a pound sign ("#") is encountered in an expression, the remaining fields are given default wild card values (i.e., −1 for the weeknum field, −99 for the working field, etc. ). The terminator field is described further below. While specific ranges of values are indicated for each field in the recurrent event expression, it should be apparent to a person skilled in the art that the present invention is not limited to a particular range of values for each field, and other range and value conventions may be utilized without departing from the scope of the present invention.

The format of the data stored in the recurrent event expression is a text string. It is stored in the recurrency field of the event table. It describes the recurrency of the event. The order of the fields in the recurring event expression makes the recurrency string smallest for daily or weekly events. Fields of the expression containing values within parentheses indicates that all of the enclosed values apply to the field. For example, the value (1, 3) in the weekday field of an expression indicates that the event occurs on both Sunday and Tuesday for 1 and 3, respectively.

Flow Diagrams Illustrating the Present Invention

The method of the present invention is illustrated in FIGS. 1A–1E. Processing begins in step 100. In step 102, the repeating event expression is obtained. In decision block 104, a check is made to determine if the day field is equal to −1. When decision block 104 returns true (yes), execution continues at decision block 200 of FIG. 1B. Otherwise, execution continues at decision block 300 of FIG. 1E.

Figure 1B:
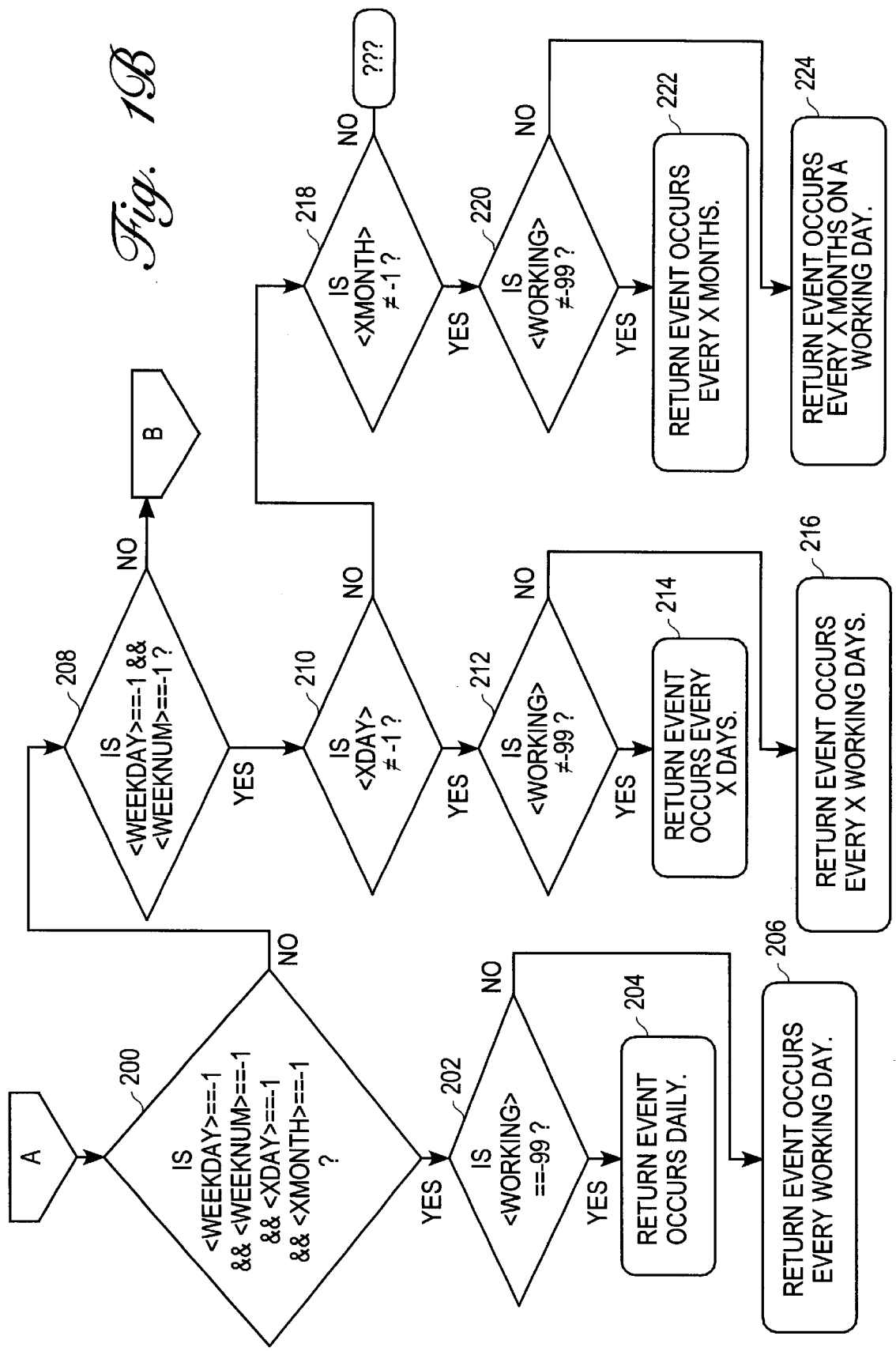
Figure 16:
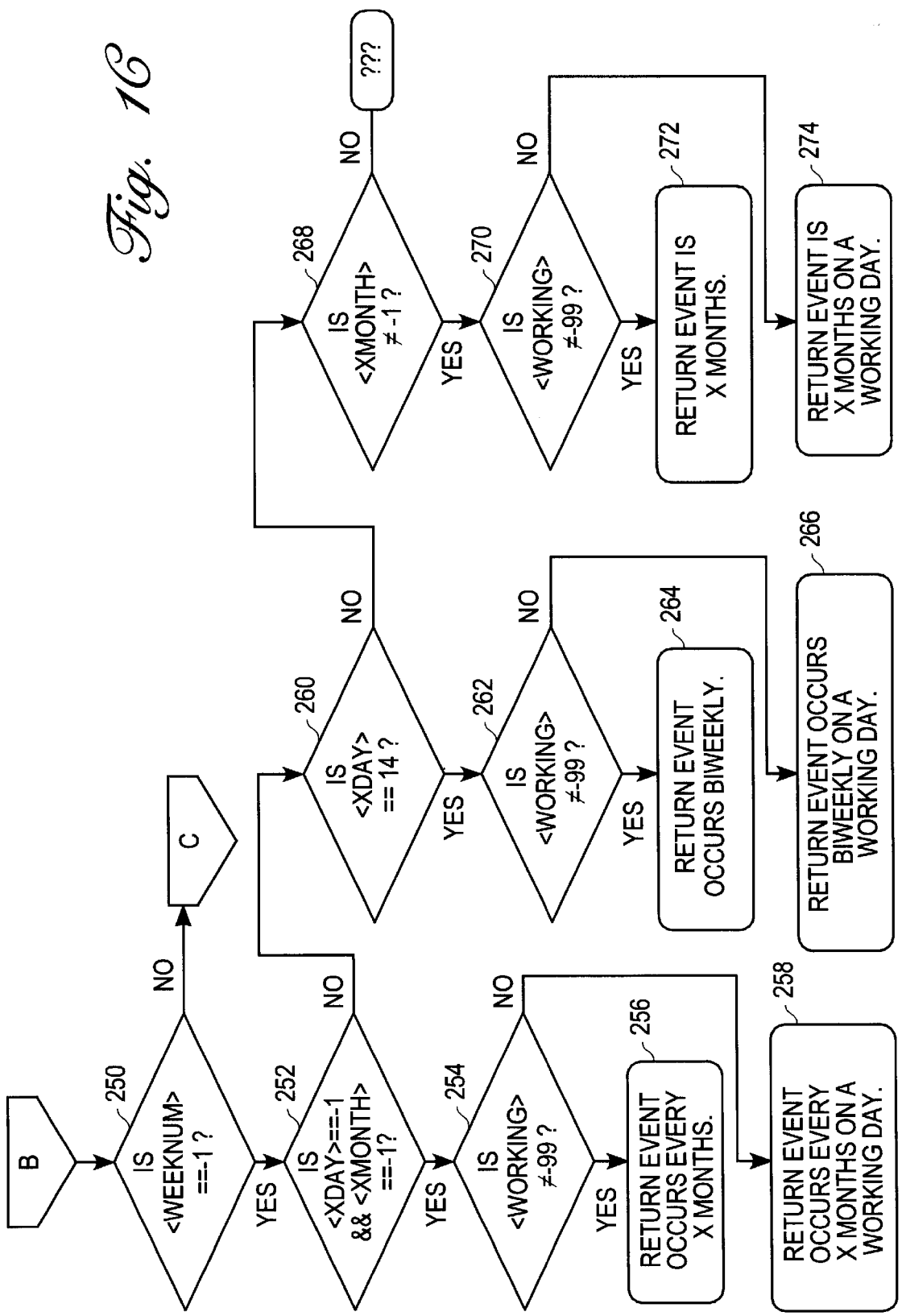

In FIG. 1B, processing continues at decision block 200. In decision block 200, a check is made to determine if the weekday field equals −1 and the weeknum field equals −1 and the xday field is equal to −1 and the xmonth is equal to −1. When decision block 200 returns true (yes), execution continues at decision block 202. In decision block 202, a check is made to determine if the working field is equal to −99. When decision block 202 returns true (yes), execution continues at step 204. In step 204, the process returns that the event occurs daily. When decision block 202 returns false (no), execution continues at step 206. In step 206, the process returns that the event occurs every working day. When decision block 200 returns false (no), execution continues at decision block 208.

In decision block 208, a check is made to determine if the weekday field is equal to −1 and the weeknum field is equal to −1. When decision block 208 returns false (no), execution continues at decision block 250 of FIG. 1C. When decision block 208 returns true (yes), execution continues at decision block 210. In decision block 210, a check is made to determine if the xday field is not equal to −1. When decision block 210 returns true (yes), execution continues at decision block 212. In decision block 212, a check is made to determine if the working field is not equal to −99. When decision block 212 returns true (yes), execution continues at step 214. In step 214, the process returns that the event occurs every x days. When decision block 212 returns false (no), execution continues at step 216. In step 216, the process returns that the event occurs every x working days. When decision block 210 returns false (no), execution continues at decision block 218.

In decision block 218, a check is made to determine if the xmonth field is not equal to −1. When decision block 218 returns true (yes), execution continues at decision block 220. In decision block 220, a check is made to determine if the working field is not equal to −99. When decision block 220 returns true (yes), execution continues at step 222. In step 222, the process returns that the event occurs every x months. When decision block 220 returns false (no), execution continues at step 224. In step 224, the process returns that the event occurs every x months on a working day.

In decision block 250 of FIG. 1C, a check is made to determine if the weeknum field is equal to −1. When decision block 250 returns false (no), execution continues at decision block 276 of FIG. 1D. When decision block 250 returns true (yes), execution continues at decision block 252. In decision block 252, a check is made to determine if the xday field is equal to −1 and the xmonth field is equal to −1. When decision block 252 returns true (yes), execution continues at decision block 254. In decision block 254, a check is made to determine if the working field is not equal to −99. When decision block 254 returns true (yes), execution continues at step 256. In step 256, the process returns that the event occurs every x months. When decision block 254 returns false (no), execution continues at step 258. In step 258, the process returns that the event occurs every x months on a working day. When decision block 252 returns false (no), execution continues at decision block 260.

In decision block 260, a check is made to determine if the xday field is equal to 14. When decision block 260 returns true (yes), execution continues at decision block 262. In decision block 262, a check is made to determine if the working field is not equal to −99. When decision block 262 returns true (yes), execution continues at step 264. In step 264, the process returns that the event occurs bi-weekly. When decision block 262 returns false (no), execution continues at step 266. In step 266, the process returns that the event occurs bi-weekly on a working day. When decision block 260 returns false (no), execution continues at decision block 268.

In decision block 268, a check is made to determine if the xmonth field is not equal to −1. When decision block 268 returns true (yes), execution continues at decision block 270. In decision block 270, a check is made to determine if the working field is not equal to −99. When decision block 270 returns true (yes), execution continues at step 272. In step 272, the process returns that the event is x months. When decision block 270 returns false (no), execution continues at step 274. In step 274, the process returns that the event is x months on a working day.

Figure 1D:
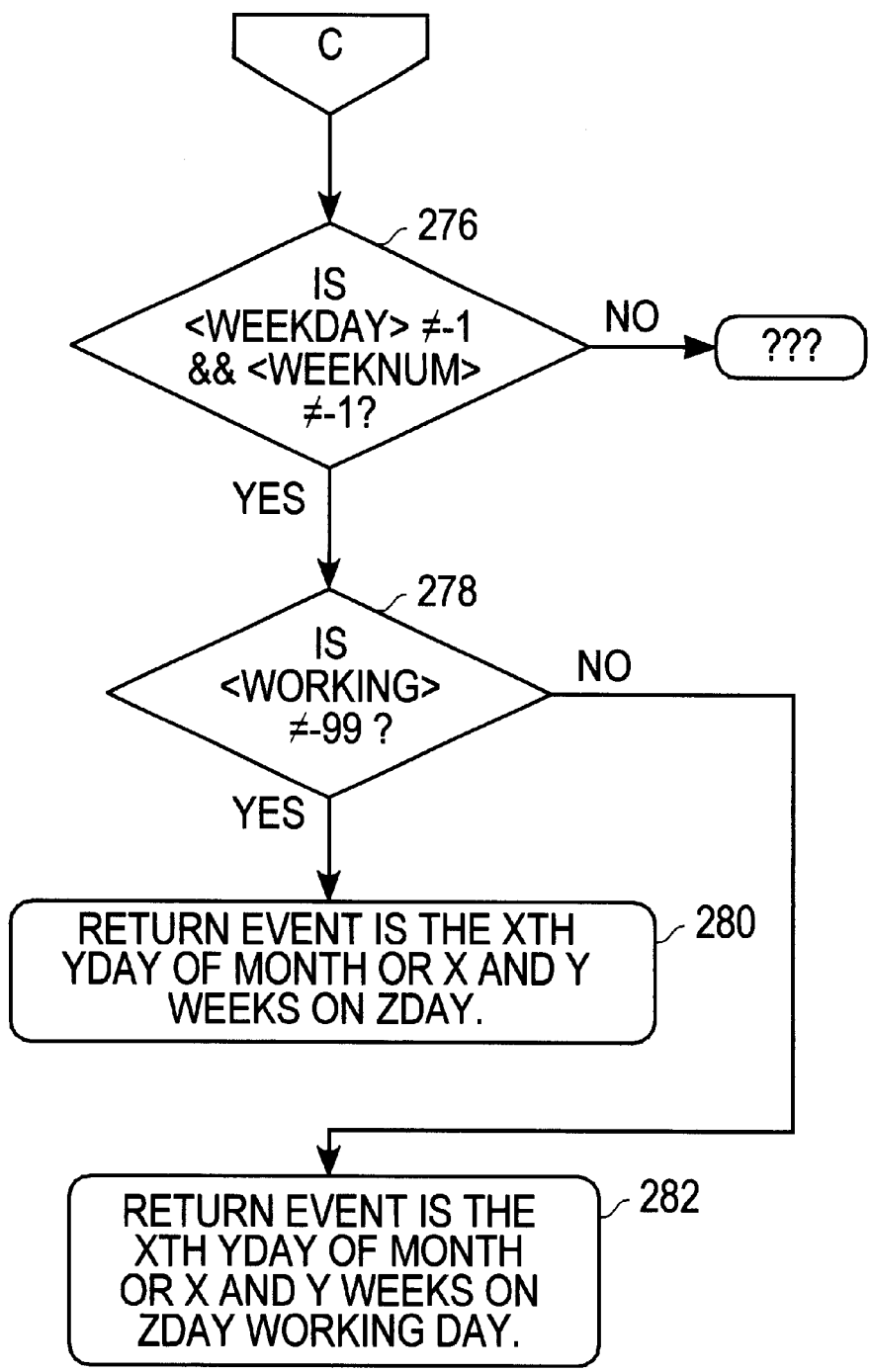

In decision block 276 of FIG. 1D, a check is made to determine if the weekday field is not equal to −1 and the weeknum field is not equal to −1. When decision block 276 returns true (yes), execution continues at decision block 278. In decision block 278, a check is made to determine if the working field is not equal to −99. When decision block 278 returns true (yes), execution continues at step 280. In step 280, the process returns that the event is the xth yday of the month or x and y weeks on zday. When decision block 278 returns false (no), execution continues at step 282. In step 282, the process returns that the event is the xth yday of month or is the x and y weeks on zday working day.

Figure 1E:
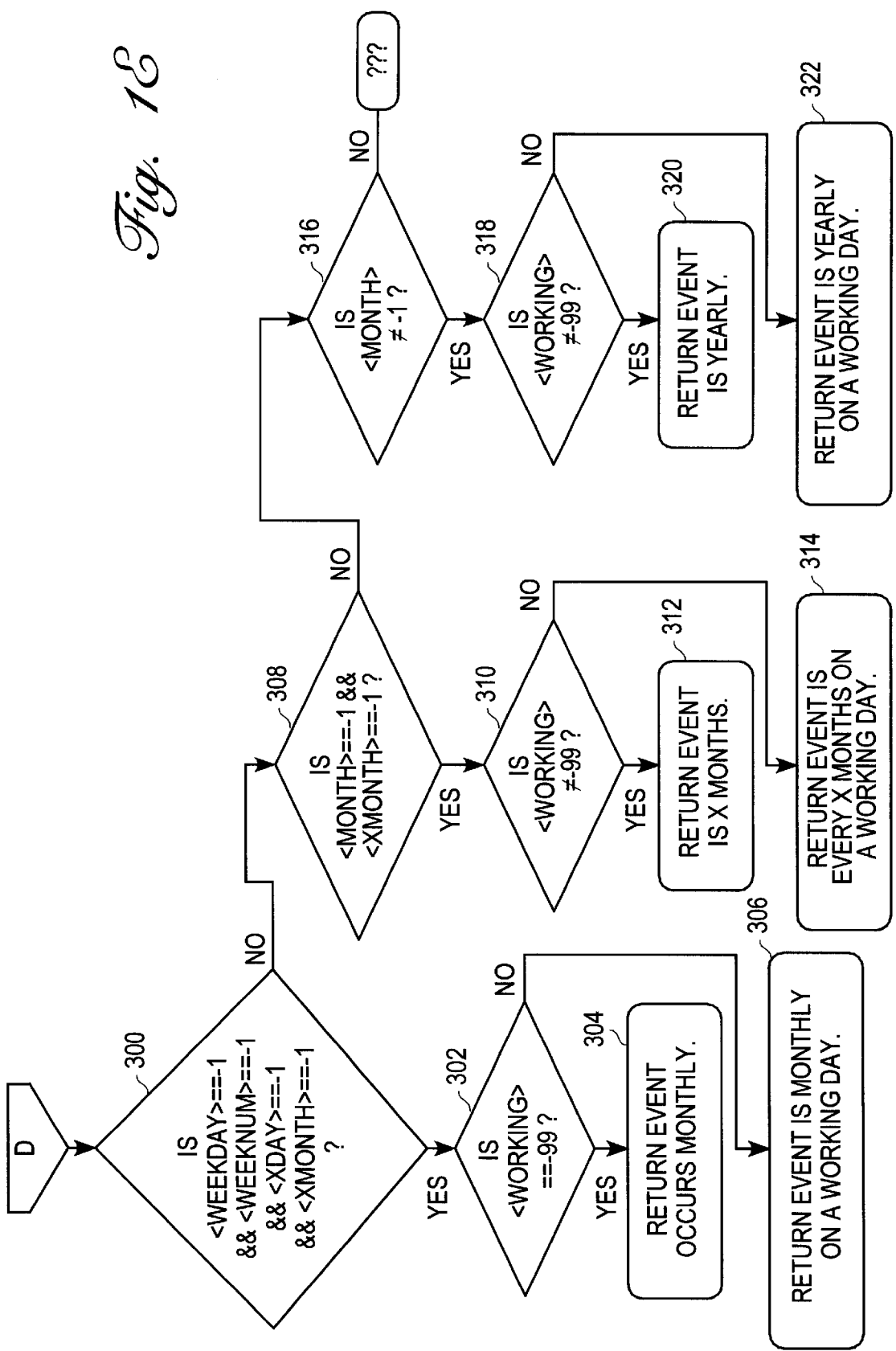

In FIG. 1E, processing begins at decision block 300. In decision block 300, a check is made to determine if the weekday field is equal to −1 and the weeknum field is equal to −1 and the xday field is equal to −1 and the xmonth field is equal to −1. When decision block 300 returns true (yes), execution continues at decision block 302. In decision block 302, a check is made to determine if the working field is equal to −99. When decision block 302 returns true (yes), execution continues at step 304. In step 304, the process returns that the event occurs monthly. When decision block 302 returns false (no), execution continues at step 306. In step 306, the process returns that the event is monthly on a working day. When decision block 300 returns false (no), execution continues at decision block 308.

In decision block 308, a check is made to determine if the month field is equal to −1 and the xmonth field is equal to −1. When decision block 308 returns true (yes), execution continues at decision block 310. In decision block 310, a check is made to determine if the working field is not equal to −99. When decision block 310 returns true (yes), execution continues at step 312. In step 312, the process returns that the event is x months. When decision block 310 returns false (no), execution continues at step 314. In step 314, the process returns that the event is every x months on a working day. When decision block 308 returns false (no), execution continues at decision block 316. In decision block 316, a check is made to determine if the month field is not equal to −1. When decision block 316 returns true (yes), execution continues at decision block 318. In decision block 318, a check is made to determine if the working field is not equal to −99. When decision block 318 returns true (yes), execution continues at step 320. In step 320, the process returns that the event is yearly. When decision block 318 returns false (no), execution continues at step 322. In step 322, the process returns that the event is yearly on a working day.

Processing of Recurrency Expressions

Table 2 illustrates several examples of recurrency expressions for repeating events. The first recurrency expression in Table 2 comprises only a terminator field "#". Thus, each field in the expression contains a wild card value by default. The language value for this recurrency expression is a daily event. The second recurrency expression has wild card values in the weekday, day, month, year, and weeknum fields. The xdays field contains a value of 3. Thus, the event occurs every 3 days. Table 2 further provides a language value for each recurrency expression. The language value of recurrency expression is determined using the method illustrated in FIGS. 1A–1E described above.

TABLE 2

| Recurrency Expression | Language Value |
|---|---|
| "#" | daily event ( all wild cards ); |
| "−1 −1 −1 −5000 −1 3 #" | every x = 3 days; |
| "−1 −1 −1 −5000 −1 −1 −1 0 #" | every working day; |
| "−1 −1 −1 −5000 −1 3 −1 0 #" | every x = 3 days, but skip non-working days; |
| "1 #" | weekly event: every Sunday; |
| "1 −1 −1 −1 −5000 −1 14 #" | biweekly event: every other Sunday; |
| "−1 (1,15) #" | semi-monthly event: occurs on 1st and 15th day of every month; |
| "5 −1 11 −5000 4 #" | xth day of month: fourth Thursday in November (Thanksgiving ); |
| "2 −1 −1 −5000 (1,3) #" | x and yth weeks of the month: 1st and 3rd Monday of the month; |
| "−1 1 #" | monthly event: the 1st day of every month; |
| "−1 99 −1 −5000 −1 −1 3 −1 #" | quarterly event: the last working day of every quarter; |
| "−1 4 7 #" | yearly event: a holiday - July 4th. |

Anti-Events and Encapsulated Non-Working Days

The present invention provides a method for allowing modification of a particular occurrence of repeating events. A recurring event can be specified so that exceptions to the occurrences of the event are stored in the recurring event expression. These dates, for which exceptions exist, are stored in the recurrency expression as anti-events. An anti-event has the same format as the format of the repeating expression given in Table 1. Each encapsulated non-working day is preceded by a terminator field ("#") to differentiate it from anti-events. Anti-events are stored as part of the recurring event expression in the database of events. The anti-events continue for however many exceptions are needed. The present invention supports an unlimited length with overflow stored in a separate table.

Recurrence Expression including anti-events:
<main expression> # <anti-event> # <anti-event> #. . .

| Recurrency Expression | Language Value |
|---|---|
| "2 # −1 12 7 1993 #" | weekly event: every Monday except Monday, July 12, 1993; |
| "−1 −1 −1 −5000 −1 −1 −1 0 ## (1,7) #" | event occurs every day except non-working days; |
| "−1 −1 −1 −5000 −1 −1 −1 0 ## (1,7) # −1 12 7 1993 #" | event occurs every day except non-working days and July 12, 1993. |

In Table 3, a recurring event expression including an anti-event is illustrated. The main expression is for a weekly event occurring on Monday. This is indicated by the number 2 immediately followed by the terminator "#". All other fields in the main expression are thereby assigned a wild card as the default value. The exception, or anti-event, follows the terminator. The anti-event expression contains a wild card value for the weekday field. The day field contains a value of 12 indicating the twelfth day of the month. The month field contains a value of 7 indicating the month of July. The year field contains a value of 1993 indicating the year 1993. The year field is immediately followed by the terminator. Thus, all other fields have wild card values by default.

Because users may have different working days, meetings that pertain to working days must also include the working days of the user initiating the event. For personal calendar events rather than enterprise events, the working day information is omitted. Instead, the user's current working day definition is used. The working day recurrency expressions contain the recurrency expression, but the user's non-working days follow the recurrency expression. This is indicated by a double pound sign ("##"). In the second recurrence expression in Table 3, the user's non-working days are Sunday and Saturday indicated by values of 1 and 7 enclosed in parentheses for the day field of the anti-event.

The encapsulated non-working days of the anti-event are preceded by an extra terminator to differentiate it from a regular anti-event. This is necessary so that anti-events are not interpreted as non-working days. This prevents the event from being shifted to a previous/next working day in cases where shifting is requested. A further example in Table 3 illustrates an event pertaining to working days and containing an anti-event. The third recurrency expression indicates an event on each working day. It includes the user's non-working days of Saturday and Sunday. Thus, an event is skipped if the event falls on a non-working day of Saturday and Sunday. Further, the last anti-event indicates that event is excepted from occurring on Jul. 12, 1993.

The present invention has the advantage of minimizing the storage requirements for scheduling systems. Repetitive calendar events are stored as single entries using an expression language. The expression language of the present invention provides an ability for expressing how often the event recurs. Thus, the days on which the event occurs are computed from the expression stored in the repetitive event. Further, the expression language provides the ability to identify exceptions. The recurrency expression can include one or more anti-event expressions. Anti-events have the same format as the recurring event. The anti-event expressions are used to generate one or more exception dates. The exception dates cancel at least one of the recurring dates. This advantageously provides the ability to define an infinite number of recurrent events from the original recurrent event definition, while minimizing the storage needed for a recurrent event.

In this manner, a method for generating recurring events in an electronic calendaring and scheduling system is disclosed.

What is claimed is:

1. In an electronic scheduling system, a computer-implemented method for displaying events to a user, said computer-implemented method comprising:

storing recurrence information and anti-event information in an event definition, wherein said recurrence information comprises an expression that specifies a plurality of events, wherein each of said plurality of events occurs at a particular time, and wherein said anti-event information comprises an expression that specifies that a subset of said plurality of events do not occur at any time;

accessing said recurrence information and said anti-event information in said event definition;

generating a plurality of recurring events and associated dates based upon said recurrence information and said anti-event information, wherein said recurring events include only those events of said plurality of events that are not members of said subset of events; and displaying a calendar having said plurality of recurring events and associated dates.

2. The computer-implemented method of claim 1 further comprising:

storing a beginning date of one of said plurality of events.

3. The computer-implemented method of claim 2, wherein generating said plurality of recurring events and associated dates based upon said recurrence information and said anti-event information further comprises generating said plurality of recurring events and associated dates based upon said beginning date of said one of said plurality of events.

4. The computer-implemented method of claim 1 further comprising:

storing said recurrence information and said anti-event information in a single entry comprising a plurality of fields; and storing a plurality of values corresponding to each of one or more of said plurality of fields.

5. The computer-implemented method of claim 4 wherein said plurality of fields comprise weekday, day, month, year, weeknum, xdays, xmonths, working, and terminator fields.

6. The computer-implemented method of claim 4 wherein said plurality of fields comprise a weekday field, said weekday field representing a day of a week for generating said plurality of recurring events and associated dates.

7. The computer-implemented method of claim 4 wherein said plurality of fields comprise a day field, said day field representing a day of a month for generating said plurality of recurring events and associated dates.

8. The computer-implemented method of claim 4 wherein said plurality of fields comprise a month field, said month field representing a month of a year for generating said plurality of recurring events and associated dates.

9. The computer-implemented method of claim 4 wherein said plurality of fields comprise a year field, said year field representing a year for generating said plurality of recurring events and associated dates.

10. The computer-implemented method of claim 4 wherein said plurality of fields comprise a first field representing a week of a month for generating said plurality of recurring events and associated dates.

11. The computer-implemented method of claim 4 wherein said plurality of fields comprise a first field representing a frequency of a specified number of days for generating said plurality of recurring events and associated dates.

12. The computer-implemented method of claim 4 wherein said plurality of fields comprise a first field representing a frequency of a specified number of months for generating said plurality of recurring events and associated dates.

13. The computer-implemented method of claim 4 wherein said plurality of fields comprise a terminator field representing termination of said recurrence information.

14. The computer-implemented method of claim 13 wherein said terminator field indicates a default value for each of said plurality of values inputted after said terminator field.

15. An electronic calendar system for displaying a plurality of events to a user, said system comprising:

a storage device to store an event definition containing a set of recurrence information and anti-event information, wherein said recurrence information comprises an expression that specifies a plurality of events, wherein each of said plurality of events occurs at a particular time, and wherein said anti-event information comprises an expression that specifies that a subset of said plurality of events do not occur at any time;

means for accessing said recurrence information and said anti-event information in said event definition and for generating a plurality of recurring events and associated dates based upon said recurrence information and said anti-event information as a calendar, wherein said recurring events include only those events of said plurality of events that are not members of said subset of events; and a display device to display said calendar.

16. A computer-readable medium carrying one or more sequences of instructions for displaying to a user, wherein execution of the one or more sequences of instructions by one or more processors causes the one or more processors to:

store recurrence information and anti-event information in an event definition, wherein said recurrence information comprises an expression that specifies a plurality of events, wherein each of said plurality of events occurs at a particular time, and wherein said anti-event information comprises an expression that specifies that a subset of said plurality of events do not occur at any time;

access said recurrence information and said anti-event information in said event definition;

generate a plurality of recurring events and associated dates based upon said recurrence information and said anti-event information, wherein said recurring events include only those events of said plurality of events that are not members of said subset of events; and display a calendar having said plurality of recurring events and associated dates.

17. The computer-readable medium of claim 16 further comprising instructions to:

store a beginning date of one of said plurality of events.

18. The computer-readable medium of claim 17, wherein the instructions to generate said plurality of recurring events and associated dates based upon said recurrence information and said anti-event information further comprises instructions to generate said plurality of recurring events and associated dates based upon said beginning date of said one of said plurality of events.

19. The computer-readable medium of claim 16 further comprising instructions to:

store said recurrence information and said anti-event information in a single entry comprising a plurality of fields; and store a plurality of values corresponding to each of one or more of said plurality of fields.

20. An apparatus for determining a plurality of recurring events, said apparatus comprising:

a database, wherein said database comprises a plurality of recurrence expressions, wherein each of said plurality of recurrence expressions specifies a plurality of events, wherein each of said plurality of events occurs at a particular time, and a plurality of anti-event expressions, wherein each of said anti-event expressions specifies that a subset of said plurality of events do not occur at any time;

a processor, wherein said processor is configured to access said database to obtain said plurality of recurrence expressions and said plurality of anti-event expressions, and generate said plurality of recurring events and associated dates based upon said recurrence expressions and said anti-event expressions, wherein said recurring events include only those events of said plurality of events that are not members of said subset of events.

* * * * *